July 2, 1935.  E. B. HUDSON  2,006,765
AUTOMATIC SCREW DOWN FOR SHEET AND TIN MILLS
Filed Feb. 7, 1933  6 Sheets-Sheet 1

INVENTOR
Edwin B. Hudson
BY Allen & Allen
ATTORNEYS

July 2, 1935.  E. B. HUDSON  2,006,765
AUTOMATIC SCREW DOWN FOR SHEET AND TIN MILLS
Filed Feb. 7, 1933  6 Sheets-Sheet 2
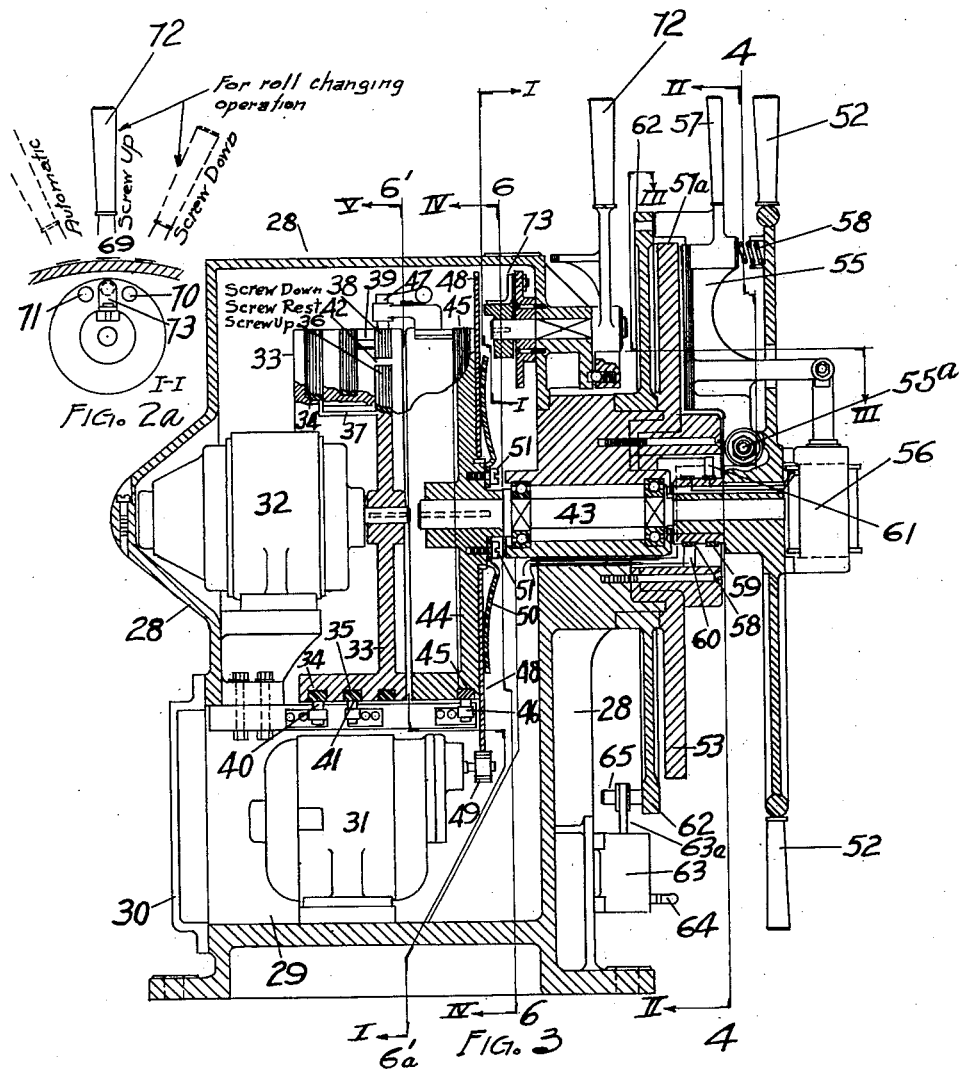

July 2, 1935.  E. B. HUDSON  2,006,765
AUTOMATIC SCREW DOWN FOR SHEET AND TIN MILLS
Filed Feb. 7, 1933  6 Sheets-Sheet 3

INVENTOR
Edwin B. Hudson
BY Allen & Allen
ATTORNEYS

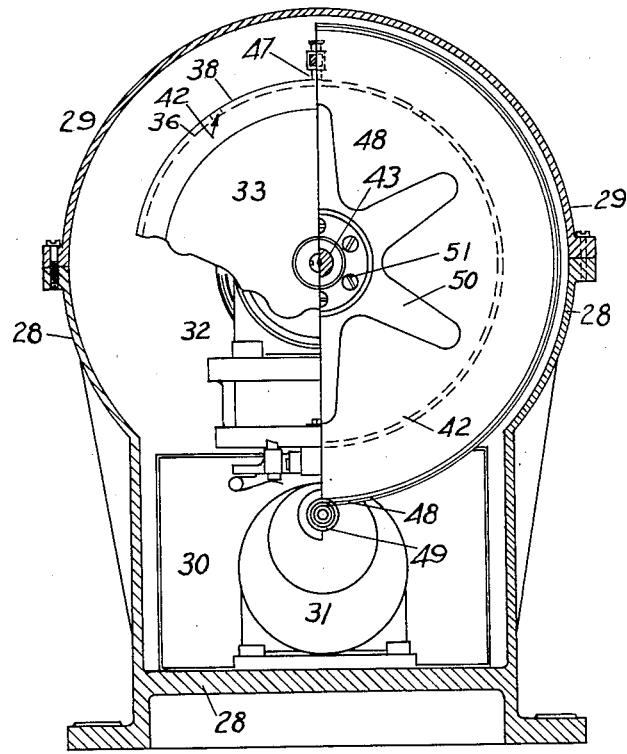

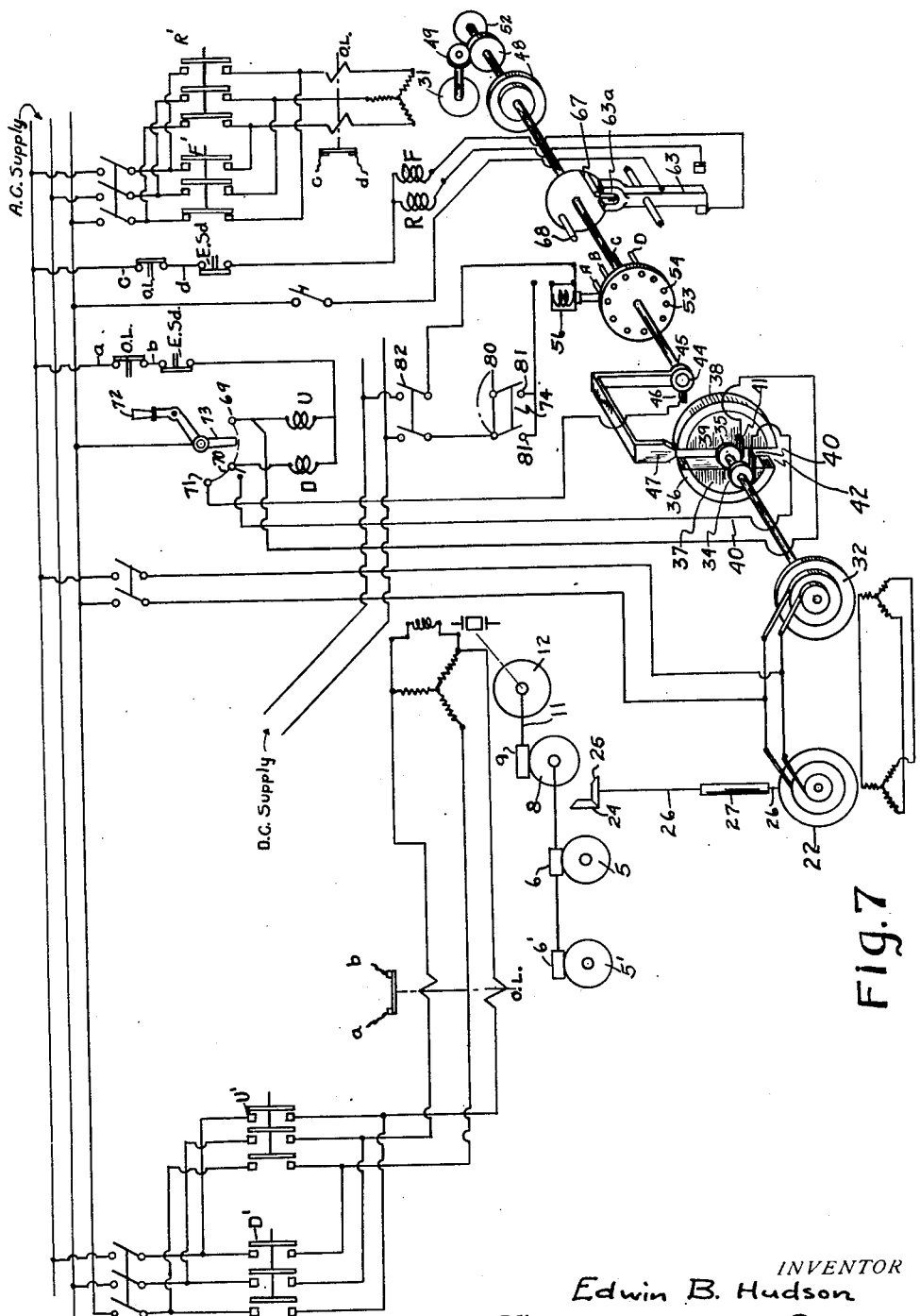

July 2, 1935. E. B. HUDSON 2,006,765
AUTOMATIC SCREW DOWN FOR SHEET AND TIN MILLS
Filed Feb. 7, 1933 6 Sheets-Sheet 6

INVENTOR
Edwin B. Hudson
BY Allen & Allen
ATTORNEYS

Patented July 2, 1935

UNITED STATES PATENT OFFICE 2,006,765

AUTOMATIC SCREW DOWN FOR SHEET AND TIN MILLS

Edwin B. Hudson, Middletown, Ohio, assignor to The American Rolling Mill Company, Middletown, Ohio, a corporation of Ohio Application February 7, 1933, Serial No. 655,628

20 Claims. (Cl. 80—56)

My invention has for its object the automatic control of the mill screw in such manner that after each pass of the material through the mill the mill screw is automatically adjusted to the proper gauge for the next pass and when the predetermined number of passes have been completed, the mill screw is then automatically adjusted for the first pass. Another object of this invention is to automatically control the mill screw with such accuracy and fineness that a product of uniform gauge and quality can be rolled thereby, entirely eliminating the human element which does not contribute to the quality of the product.

Another object of my invention is the mechanical improvement of the screwdown machinery in such manner that each of the mill screws can operate in different relative positions to compensate for mill brass wear, providing means for the separate adjustment of each mill screw in relation to each other. Provision is also made to mount the mill screwdown motor on the mill housings, thereby protecting it from rolling shocks that are transmitted to the mill screw.

My invention is particularly suited to mills rolling sheet metal or tin plate where the gauge tolerances are low and a uniform gauge is desirable. It is the general practice when rolling thin gauge material to start with sheet, bar or thin rough plate of known weight and size, and roll the material to such a length (elongation) as to produce the desired gauge. My invention is particularly suited for this method of rolling, as corrections can be easily and quickly made to insure the rolling of the material to the proper elongation. My invention is particularly suited for sheet or tin mills of the two-high and three-high type when used in combination with feeding and catching tables.

The following is a full description of an exemplary embodiment of my invention, which is not limiting and is subject to change in detail without departing from the spirit thereof.

In the drawings:

Fig. 2a is a diagram of the three-point control switch.

Fig. 3 shows a section through the automatic control apparatus for controlling the position of the mill screws for the various passes of a predetermined program of rolling for reducing the material to the desired gauge.

Fig. 6 shows vertical sections through the control apparatus, the right and left halves being on the lines 6—6 and 6a—6a, respectively, of Fig. 3.

Fig. 7 shows the wiring diagram controlling the mill screws by means of the control apparatus illustrated in Fig. 3.

Figure 1:
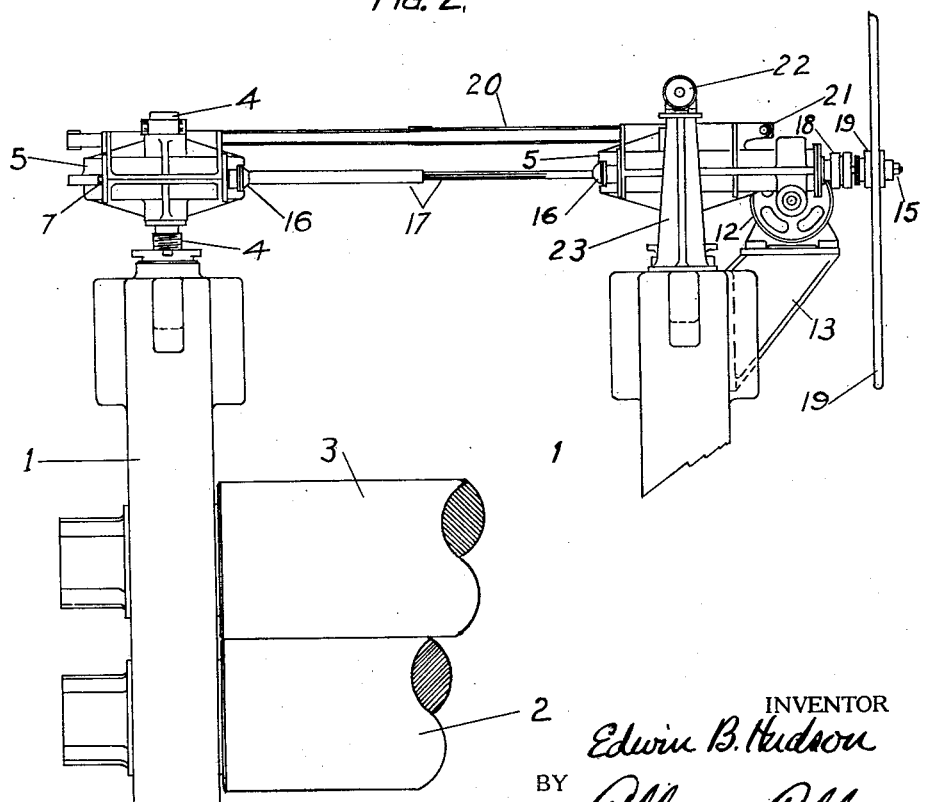
Figure 1 shows the layout of a typical two-high mill stand in elevation for rolling thin sheets or tin plate with my improved screw down mechanism.
Figure 4:
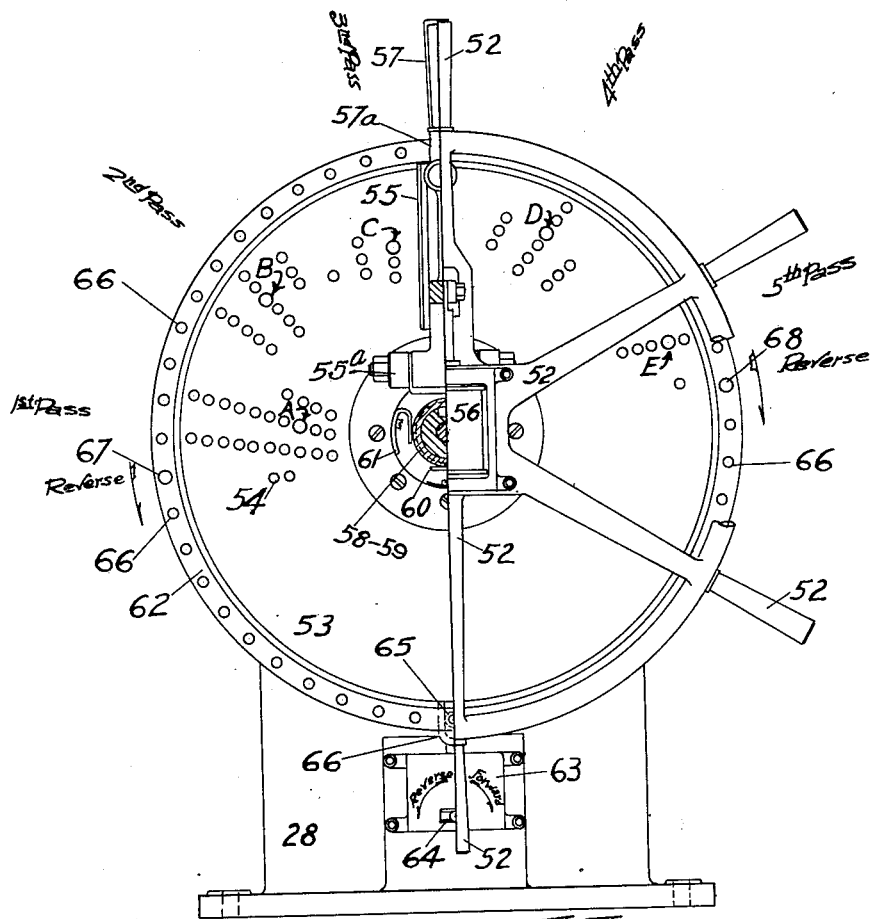
Fig. 4 is partly a front elevation, looking to left in Fig. 3, and partly a vertical section on line 4—4 of Fig. 3, of the automatic control apparatus.

Fig. 1 illustrates a typical two-high mill on which thin gauge sheets and tin plate are rolled, the mill housings 1 supporting mill rolls 2 and 3, and mill screws 4 which are driven through worm wheel 5 mounted in gear case 5' by means of the tubular worm shaft 6 on the motor side and worm shaft 7 on the off side. Tubular worm shaft 6 is provided with a worm gear 8 integral with the shaft which is driven through worm 9, flexible couplings 10 and telescopic shaft 11 by means of motor 12 mounted on bracket 13 which is attached to mill housing 1. Motor 12 is provided with an electric brake 14. Internal shaft 15 extends through tubular shaft 6 and is connected to shaft 7 of the worm gear set on the left screw through flexible couplings 16 and telescopic shaft 17.

Figure 2:
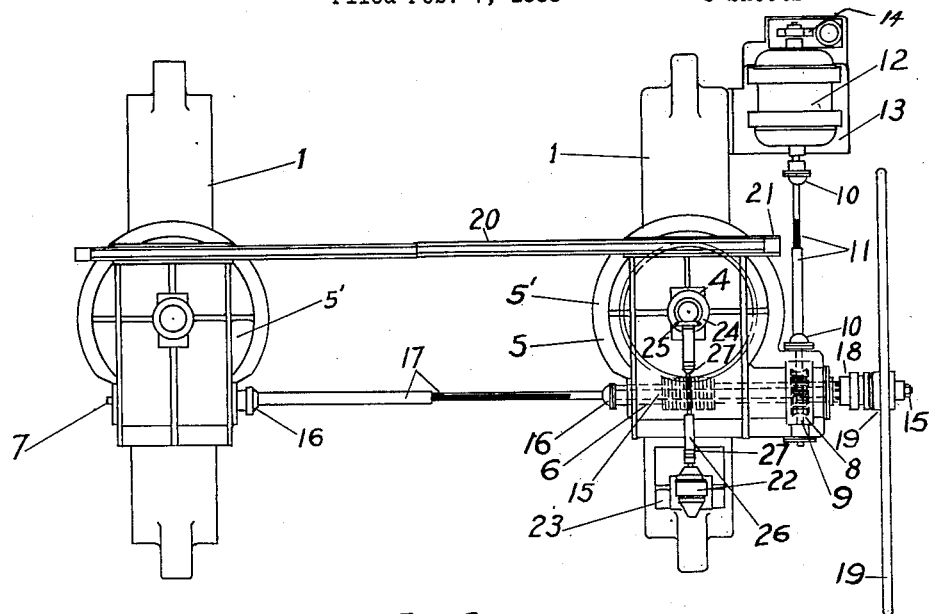
Fig. 2 shows the improved screw down arrangement of Fig. 1 in plan.

Power is transmitted from tubular worm shaft 6 to internal shaft 15 through multiple jaw clutch 18, splined on tubular worm shaft 6, to hand wheel hub 19, which is keyed to internal shaft 15. In Fig. 1 clutch 18 is disengaged from 19 allowing adjustments to be made to the left screw by handwheel 19 when the screw down motor 12 is stationary. Fig. 2 shows clutch 18 engaged with hub 19, allowing the mill screws 4 to be operated together. No shifting lever is shown for clutch 19 as any suitable arrangement may be used or the roller may shift the clutch 18 with his tongs.

To prevent rotation of gear cases 5', bar 20 is mounted in slots as shown and pivotally mounted in the right gear case 5' at 21. Bar 20 and shaft 17 are capable of telescoping so that different lengths of roll barrels may be used. To transmit the movements of the mill screw 4 to the automatic control apparatus (Fig. 3) thereby indicating its position, a self-synchronous generator 22 (not a part of this invention) is mounted on base 23 connected direct to the mill screw 4 through telescopic shaft 26, flexible coupling 27 and bevel gears 24 and 25. These gears have 1:1 ratio for ⅜ pitch mill screw, or 1:2 ratio for ¾ pitch mill screw.

In the design of such apparatus to automatically control the mill screw, two basic principles are concerned. First, means have to be provided to initially establish the rolling program, the number of passes and the amount of reduction of each pass. Second, means must be provided to follow this rolling program as it has been established.

Fig. 3 illustrates the automatic control apparatus on which the rolling program is established and executed in the sequence of the various passes. The main case 28 has the lower part 29 having a removable end cover 30 for access to the motor 31 enclosed therein. The self-synchronous motor 32 in the upper part of case 28 is driven by the self-synchronous generator 22 according to the position of the mill screw. Mounted on the shaft of self-synchronous motor 32 is a drum 33 made of non-conducting material on which are mounted two collector rings 34 and 35. This drum also carries segment 36 connected to collector ring 34 by means of shunt 37 and segment 38, connected to collector ring 35 by means of shunt 39. Brush 40 engages collector ring 34 and brush 41 engages collector ring 35 as shown. Segments 36 and 38 are separated by two short gaps 42 at 180 degrees spacing as indicated in Fig. 6. Coaxially mounted on shaft 43 is a second insulating drum 44. This second drum 44 is subject to either mechanical or manual rotation, and is provided with one collector ring 45 which engages brush 46 fixed in the housing. Rotating with ring 45 is contact brush 47 which, upon relative rotation of drums 33 and 44, engages rings 36 and 38, crossing gaps 42. Shaft 43, preferably having ball bearings as shown, carries second drum 44 and is capable of rotation in either direction by lower motor 31 through slip gear 48 and pinion 49. Slip gear 48 is frictionally engaged to drum 44 by start spring 50 adjusted by screws 51 in drum 44. Shaft 43 also may be turned by the hand wheel 52 fixed on front end of shaft 43.

Figure 5:
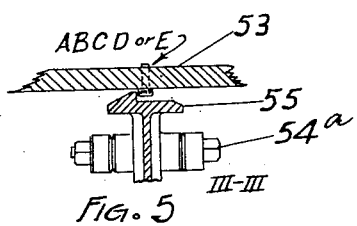
Fig. 5 illustrates the shape of the latch and its relation to pass pins inserted in pass plate, thereby establishing the pass program.

Rigidly connected to front of casing 28 is circular pass plate 53, which is drilled with 375 small holes 54 arranged in concentric series and evenly spaced for a ⅜ pitch mill screw, each hole representing 1/1000 of an inch of mill screw movement. Hinged to hand wheel 52 at 55a is radial latch bar 55; withdrawn from plate 53 by escapement solenoid 56 mounted on wheel 52, or by handle 57, and held against plate 53 by spring 58. Current is conducted to escapement solenoid 56 by collector rings 58, 59 on an insulating collar turning with shaft 43 and brushes 60 and 61 inside a hut fixed in pass plate 53. Latch 55 is beveled on the left edge as shown in Fig. 5 for slipping over the pass pins A, B, C, D and E, in pass plate 53 upon counter-clockwise rotation of shaft 43.

Directly behind pass plate 53 is reverse ring 62, which is mounted on casing 28 for limited rotation (about 5 degrees) and controls the direction of rotation of motor 31 by means of reversing switch 63 in series with on and off switch 64. Reverse ring 62 is provided with pin 65, which engages fork 63a of switch 63; and also is provided with a series of holes 66 into which reverse pins 67 and 68 are inserted fifteen degrees, more or less, ahead of the first pass and after the last pass as shown. On latch 55, projection 51a engages the reverse pin 68 of ring 62 after the last pass is completed, acting through pin 65 and fork 63a for hand reversing motor 31, rotating wheel 52 in a counter-clockwise direction, and allowing latch 55 to pass back over pass pins A, B, C, D and E due to the beveled face of latch 55.

The automatic control apparatus is provided with a three point switch (Fig. 2a), two points for manual operation, either screw up point 69, screw down point 70, and the third being point 71 for automatic operation, as hand lever 72 brings electric contact arm 73 into contact with one or another point 69, 70 and 71.

Figure 9:
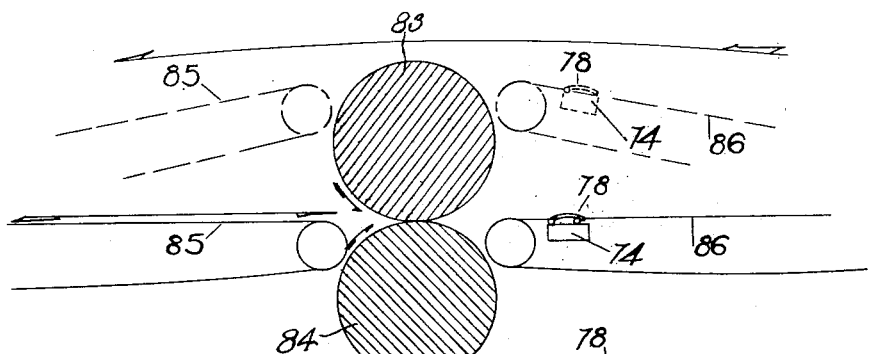
Fig. 9 shows the arrangement of the switch of Fig. 8 in the mill catching table controlling the circuits to the escapement solenoid for a two-high mill.
Figure 8:
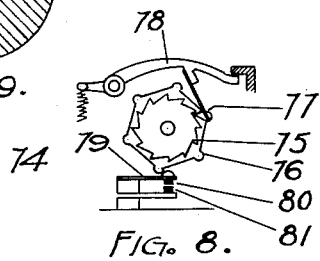
Fig. 8 shows the general arrangement of the table switch for the escapement solenoid circuit.

For a two-high mill installation shown in Fig. 9 with mill rolls 83 and 84, feeder table 85 and catcher table 86, special switch 74 is provided on the catching table 86 as shown. The switch 74 is of such design that the circuit is momentarily completed on every second actuation of the switch. The return of the sheet or tin pack back over the switch entering the mill mechanically actuates it but does not close it electrically. The switch is closed electrically only after the rear end of the pack has cleared the switch. It comprises a ratchet wheel and a lobed contact cam coaxially united. The ratchet teeth 75 are twice as many as the lobes 76 on the contact cam. The ratchet is rotated on an angle equal to one ratchet tooth 75 by each upward movement of dog 77 as the tail end of the sheet pack clears the lever 78, carrying dog 77, but lobe 76 only contacts switch blade 79 on every second mechanical cycle, closing electrical contacts 80 and 81 momentarily and sending a short electrical impulse to escapement solenoid 56, through circuit illustrated in Fig. 7. This circuit includes a control switch 82.

Figure 10:
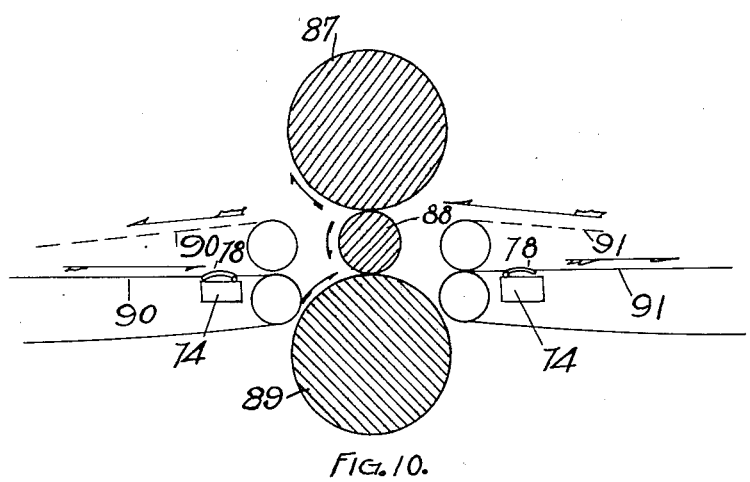
Fig. 10 shows the arrangement of such switches in the feeder table and catcher table, respectively, controlling the circuit to the escapement solenoid for a three-high mill.

For a three-high mill having rolls 87, 88 and 89, two such switches 74 are used. One is placed on feeder table 90 and one on catcher table 91, as shown in Fig. 10.

The screw down motor 12 is provided with over-size electric brake 14 to prevent any drift and to eliminate slow down contactors in the screw down motor circuit.

The follow up switch is illustrated, in the wiring diagram for automatic control in Fig. 7, by parts 36, 38, 40, 41, 42 and 47, which are also shown in Fig. 3. Reversing switch 63 and start and stop switch 64 for motor 31 are shown and automatic and manual switch 72 also is shown with connections in Fig. 7.

The operation of my invention is as follows: The rolling program is first established by ascertaining the positions of the hand wheel 52 for the various passes using drafts as is the present practice. To establish the rolling program, switch 72 is placed in the automatic position and switches 64 and 82 are opened. All pass pins are removed from the pass plate 53; now the mill screw is under control of hand wheel 52 and this wheel is operated manually to set the mill screw, as is done on electric screw down devices known in the art.

After the first pass of the material through the mill, the position of hand wheel 52 for that pass is noted, and first pass pin A is put in the pass plate 53 in the proper position. This method is followed until all the pass pins are in their proper positions in pass plate 53, giving the desired reductions and elongation (gauge). After the pass pins are located, reverse pins 67 and 68 are placed in the reverse ring 62 about 10 degrees ahead of the first pass and the same angle behind the last pass. For automatic operation, switches 64 and 82 are then closed for the operation of motor 31 and escapement solenoid 56.

When the automatic control apparatus is set for the first pass latch 55 is against pass pin A. Motor 31 is rotating slip gear 48 clockwise in the direction of pass pin B, but the rotation of hand wheel 52 is prevented by pass pin A until the sheet pack leaves the mill, which energizes momentarily escapement solenoid 56 by the table switch 74, which unlatches latch 55, allowing hand wheel 52 to rotate, with slip gear 48 friction with spring 50, and latch 55 to come to second pass pin B. This movement of the hand wheel 52 to the new position at pass pin B causes contact 47 to move from segment gap 42 to contact with the screw down segment 38, closing the circuit to the screw down motor 12, running the mill screw 4 downward. The driving of the mill screw 4 downward drives the self-synchronous generator 22 through connections 24, 25 and 26 and 27; and the self-synchronous generator drives the self-synchronous motor 32 the same amount of rotation that was thus imparted to the self-synchronous generator 22 mechanically. Self-synchronous motor 32 therefore sets drum 33 of the automatic control apparatus in exact accordance with the position of the mill screw.

The rotation of hand wheel 52 to engage latch 55 with pass pin B brings contact 47 around to the position where the mill screw is to stop for the second pass. Since the screw down motor 12 has started the mill screw downward to position for second pass, then drum 33 is being rotated by self-synchronous motor 32 so as to overtake contact 47 in its new position for the second pass. Drum 33 continues to follow in this direction as long as contact 47 contacts segment 38, and when gap 42 reaches contact 47 the screw down motor 12 stops without drift by the aid of the over-size electric brake 14.

Should contact 47 overrun gap 42, then contact 47 will engage screw-up segment 36 running the mill screw up until gap 42 is reached by contact 47, effecting the correct screw setting. In actual practice the over-run will be prevented by using a brake 14 of such capacity that it will stop screw down motor 12 in less than three revolutions. This arrangement will cause the screw to stop dead at the various pass positions without drift. The cycle described is executed until all the passes are completed as established by the roll program established on pass plate 53.

After the last pass is completed, whereby latch 55 is released from the last pass pin E, hand wheel 52 continues to turn clockwise until projection 57a engages reverse pin 68, rotating reverse ring 62 around five degrees in a clockwise direction, throwing switch 63 to reverse position. This reverses motor 31, which now rotates handwheel 52 in a counter-clockwise direction with latch 55 passing over all pass pins due to its beveled edge, until projection 57a engages the other reverse pin 67. This again reverses motor 31, driving hand wheel 52 clockwise until latch 55 engages pass pin A for the first pass of the next cycle.

Referring now to Fig. 7, which is a wiring diagram of my invention with interrelating mechanical parts shown schematically, the contact between 36 and 47 energizes the coil D, thereby closing the contactor D¹ of the screw down motor 12, causing the motor 12 to lower the mill screw 4. Contact between 38 and 47 energizes the coil U, thereby closing the contactor U¹ of the screw down motor 12, causing the motor 12 to raise the mill screw 4.

The self-synchronous generator 22 is mechanically connected to the mill screw down by means of the gears 24, 25, the telescopic shaft 26, and the coupling 27. The self-synchronous generator 22 will drive the segments 36 and 38 through the self-synchronous motor 32 the exact number of rotations of the mill screw 4 or any fractions thereof, thereby keeping the mill screws 4 and the segments 36 and 38 in exact relative positions to each other. The contact arm 47 is positioned for the next pass by the stop pins A, B, C or D in the pass plate 53, and the contact 47 is rotated into the new pass position by the motor 31 driving through the pinion 49 to the friction gear 48, thereby rotating the shaft 43 which rotates the contactor arm 47. When the contactor arm 47 moves into the new pass position to lower the mill screws 4, it contacts the segment 38 and energizes the coil D, thereby closing the contactor D¹ causing the mill motor to lower the mill screws 4. The rotation of the mill screws 4 also rotates the segments 36 and 38 by means of the gears 24—25, the shaft 26, the coupling 27, the self-synchronous motor 32, and the self-synchronous generator 22, so that the gap between the segments 36 and 38 follows the contact arm 47. The contact arm 47 will rotate until it is stopped by the pass pin A, B, C or D in the pass plate 53. When this occurs the segments 36 and 38 will continue to rotate until the contact arm 47 makes contact with neither of the segments 36 and 38, when the coil D is de-energized and the contactor D¹ is opened and the motor 12 stops. The mill screws 4 are now in position for the next pass. When the last pass has been completed, the reverse pin 68 on the reverse ring 62 is contacted by the member 55 which reverses the switch 63 through the arm 63a, reversing the motor 31 through the coil R, thereby rotating the shaft 43 in a counter-clockwise direction until the reverse pin 67 in the reverse ring 62 is engaged, moving the switch 63 to the forward position by means of the coil F and the contactor F¹. The shaft 43 will then rotate in a clockwise direction until the member 55 engages the pass pin A (first pass) in the pass plate 53. After the first pass is completed, the solenoid 56 is energized by the table switch 74, and the shaft 43 rotates to the second pass position B.

Adjustments can be made quickly to roll to the proper elongation (gauge) on the last pass by moving the last pass pin E into a new position to either reduce or increase the last pass. Under these conditons the pass pins for all other passes need not be disturbed.

Without further description it is thought the features and advantages of my invention will be readily apparent to those skilled in the art, and it will of course be understood that changes in form, proportion and minor details of construction may be resorted to without departing from the scope and spirit of my invention as set forth in the appended claims.

Having thus described my invention, what I claim as new and desire to secure by Letters Patent, is:—

1. In an automatic screw-down device for a rolling mill, means for driving the mill screw, a control member driven in synchronism with the mill screw, a control member driven independently of the mill screw, means whereby the driving of the second member is restricted to step-by-step movements relative to the first member, in time with successive passages of material through the mill, and means carried by the respective control members, having controlling connection with the mill screw driving means, and coacting to allow running or cause stoppage of the driving means and mill screw incident to changes in relative positions of said members.

2. In an automatic screw-down device for a rolling mill, means for driving the mill screw, a control member, an electrical current generator driven by the mill screw, an electric motor driven by said generator in synchronism therewith and driving said control member, a control member driven independently of the mill screw, means whereby the driving of the second member is restricted to step-by-step movements relative to the first member, in time with successive passages of material through the mill, and means carried by the respective control members, having controlling connection with the mill screw driving means, and coacting to allow running or cause stoppage of the driving means and mill screw incident to changes in relative positions of said members.

3. In an automatic screw-down device for a rolling mill, means for driving the mill screw, a control member driven in synchronism with the mill screw, a control member driven independently of the mill screw, a stop member driven with the second control member, a fixed stop member, an escapement device on one stop member, a series of stop elements arranged on the other stop member to be successively engaged by the escapement device in the course of the relative rotation of the stop members, means operating said escapement device in time with successive passages of material through the mill, and means carried by the respective control members, having controlling connection with the mill screw driving means, and coacting to allow running or cause stoppage of the driving means and mill screw incident to changes in relative positions of said members.

4. In an automatic screw-down device for a rolling mill, means for driving the mill screw, a control member driven in synchronism with the mill screw, a control member driven independently of the mill screw, an electro-magnetically operated escapement device operatively related to the second control member, and a switch controlling supply of current to said escapement device, and operated by engagement of material passing through the mill, whereby the driving of the second member is restricted to step-by-step movements relative to the first member, in time with successive passages of material through the mill, and means carried by the respective control members, having controlling connection with the mill screw driving means, and coacting to allow running or cause stoppage of the driving means and mill screw incident to changes in relative positions of said members.

5. In an automatic screw-down device for a rolling mill, means for driving the mill screw, a control member driven in synchronism with the mill screw, a control member driven independently of the mill screw, means whereby the driving of the second member is restricted to step-by-step movements relative to the first member, in time with successive passages of material through the mill, means whereby driving of the second member is reversed incident to movement thereof, and means carried by the respective control members having controlling connection with the mill screw driving means, and coacting to allow running or cause stoppage of the driving means and mill screw incident to changes in relative positions of said members.

6. In an automatic screw-down device for a rolling mill, means for driving the mill screw, a control member driven in synchronism with the mill screw, a second control member, driving means for said second member having a slipping driving connection therewith, a latch carried with said second member, stop elements adjustable along the path of said latch, engageable by the latch only when it is in latching position and means moving said latch into and out of latching position, whereby the driving of the second member is restricted to step-by-step movements relative to the first member, in time with successive passages of material through the mill determined by the adjustment of said stop elements, and means carried by the respective control members, having controlling connection with the mill screw driving means, and coacting to allow running or cause stoppage of the driving means and mill screw incident to changes in relative positions of said members.

7. In an automatic screw-down device for a rolling mill, means for driving the mill screw, a control member driven in synchronism with the mill screw, a second control member, driving means for said second member having a slipping driving connection therewith, a latch carried with said second member, stop elements adjustable along the path of said latch, engageable by the latch only when it is in latching position and means moving said latch into and out of latching position, whereby the driving of the second member is restricted to step-by-step movements relative to the first member, in time with successive passages of material through the mill determined by the adjustment of said stop elements, a device operative to reverse the driving of said second member, and elements movable with said second member and said reversing device, respectively, mutually engageable for operation of said reversing device incident to movement of said second member, and adjustable to engage earlier or later in said movement in accordance with the adjustment of said stop elements.

8. In an automatic screw-down device for a rolling mill, means for driving the mill screw, a control member driven in synchronism with the mill screw, a control member driven independently of the mill screw, mechanism adapted by intermittent actuation to restrict said second member to a cycle of step-by-step movements relative to the one member, including an electromagnetic device to control its actuation, a current source, a switch operated incident to passage of material through the mill, controlling supply of current from said source to said electromagnetic device, in time with successive passages of material through the mill, and means carried by the respective control members, having controlling connection with the mill screw driving means, and coacting to allow running or cause stoppage of the driving means and mill screw incident to changes in relative positions of said members.

9. In an automatic screw-down for a rolling mill, an electric motor for driving the mill screw, a source of current, and means whereby the running of the mill screw, together with passage of a rolled article, controls the running of said motor and screw, comprising relatively rotatable commutating members so included in circuit with said motor and said current source as to run the motor and screw in one direction or the other or to stop the motor and screw, incident to the relative rotation of the commutator members, means whereby one commutator member is rotated in synchronism with the mill screw, means whereby the other commutator member is caused to have successive partial rotations timed with successive passages of the rolled article, and means actuated incident to rotation of said other commutator member to reverse the rotation thereof after a number of said partial rotations thereof.

10. In an automatic screw-down for a rolling mill, an electric motor for driving the mill screw, a source of current, and means whereby the running of the mill screw, together with passage of a rolled article controls the running of said motor and screw, comprising relatively rotatable commutating members so included in circuit with said motor and said current source as to run the motor and screw in one direction or the other or to stop the motor and screw, incident to the relative rotation of the commutator members, means whereby one commutator member is rotated in synchronism with the mill screw, means whereby the other commutator member is caused to have successive partial rotations timed with successive passages of the rolled article, and means actuated incident to the reverse rotation to restore the initial direction of rotation of said other commutator member for a repeated cycle of operation thereof.

11. In an automatic screw-down for a rolling mill, an electric motor for driving the mill screw, a source of current, and means whereby the running of the mill screw, together with passage of a rolled article, controls the running of said motor and screw, comprising a rotatable commutator member comprising spaced segments reversely connected in circuit with said motor and source of current, a rotatable commutator member comprising a contact element connected in said circuit, said members being relatively rotatable and said contact element contacting one or the other or neither segment so as to run the motor and screw in one direction or the other or to stop the motor and screw, incident to the relative rotation of the commutator members, means whereby one commutator member is rotated in synchronism with the mill screw, means whereby the other commutator member is caused to have successive partial rotations timed with successive passages of the rolled article, and means actuated incident to rotation of said other commutator member to reverse the rotation thereof after a number of said partial rotations thereof.

12. In an automatic screw-down for a rolling mill, an electric motor for driving the mill screw, a source of current, and means whereby the running of the mill screw, together with passage of a rolled article, controls the running of said motor and screw, comprising relatively rotatable commutating members so included in circuit with said motor and said current source as to run the motor and screw in one direction or the other or to stop the motor and screw, incident to the relative rotation of the commutator members, means whereby one commutator member is rotated in synchronism with the mill screw, a fixed stop member, a stop member connected to said other commutator member to rotate therewith, stop elements adjustable around one stop member, and a latch on the other stop member movable into and out of position for stopping engagement with said stop elements, means whereby said latch is moved into and out of said position in time with successive passages of the rolled article, and means for rotating said other commutator member, having a frictional operative connection therewith.

13. In an automatic screw-down for a rolling mill, an electric motor for driving the mill screw, a source of current, and means whereby the running of the mill screw, together with passage of a rolled article, controls the running of said motor and screw, comprising relatively rotatable commutating members so included in circuit with said motor and said current source as to run the motor and screw in one direction or the other or to stop the motor and screw, incident to the relative rotation of the commutator members, means whereby one commutator member is rotated in synchronism with the mill screw, a latch carrier connected to said other commutator member to rotate therewith, a fixed stop plate, a series of stop elements adjustable on said stop plate, a latch on the latch carrier, movable into and out of position for stopping engagement with said stop elements, means whereby said latch is moved into and out of said position in time with successive passages of the rolled article, and means for rotating said other commutator member having a frictional operative connection therewith.

14. In an automatic screw-down for a rolling mill, an electric motor for driving the mill screw, a source of current, and means whereby the running of the mill screw, together with passage of a rolled article, controls the running of said motor and screw, comprising relatively rotatable commutating members so included in circuit with said motor and said current source as to run the motor and screw in one direction or the other or to stop the motor and screw, incident to the relative rotation of the commutator members, means whereby one commutator member is rotated in synchronism with the mill screw, a latch carrier, connected to said other commutator member to rotate therewith, a fixed stop plate, a series of stop elements adjustable on said stop plate, a latch on the latch carrier, movable into and out of position for stopping engagement with said stop elements, means whereby said latch is moved into and out of said position in time with successive passages of the rolled article, an electric motor for rotating said other commutator member having a frictional operative connection therewith, a source of current for said motor, a reversing switch in circuit with said motor and current source, an operating member to operate said reversing switch, and engaging means on the operating member and the latch carrier, respectively, relatively adjustable to engage for operation of said reversing device after the latch has passed the series of stop elements upon rotation of said other commutator member in either direction, said latch member being adapted to make retentive engagement with said stop elements only when rotating in one direction.

15. In an automatic screw down for rolling mills comprising a control switch for the screw down motor made up of a plurality of members operated in synchronism with the screw and an additional member movable to successively coact with said members, stop means for said additional member, releasable detent means for said stop means, electromagnetic means for operating said detent means, and a switch actuated incident to passage of an article rolled by the mill, controlling the action of said electromagnetic means.

16. In an automatic screw down for rolling mills comprising a control switch for the screw down motor made up of a plurality of members operated in synchronism with the screw and an additional member movable to successively coact with said members, stop means for said additional member, releasable detent means for said stop means, electromagnetic means for operating said detent means, and a switch actuated incident to passage of an article rolled by the mill, controlling the action of said electromagnetic means, comprising a member moved by the article in its outgoing passage and again moved by the article in its inward return passage, a ratchet wheel partially rotated by said member at each movement thereof, a lobed member rotating with said ratchet wheel, and means whereby the lobes successively complete an electrical circuit through the electromagnetic means, the number of lobes of said member being half the number of teeth of the ratchet wheel, whereby the circuit is completed only at each alternate partial rotation of the ratchet wheel and lobed member.

17. In an automatic screw down for three-high rolling mills comprising a control switch for the screw down motor made up of a plurality of members operated in synchronism with the screw and an additional member movable to successively coact with said members, stop means for said additional member, releasable detent means for said stop means, electromagnetic means for operating said detent means, and switches at opposite sides of the mill rolls, each actuated incident to passage of an article rolled by the mill in a respective direction, controlling the action of said electromagnetic means.

18. In an automatic screw down for rolling mills, a mill screw driving motor, a plurality of rotatable control members rotated in synchronism with the mill screw and an additional member movable to successively coact with said members, coacting stop members, one rotating with said additional member to stop the said additional member at successive required intervals of rotation, the stop member rotating with said additional member being frictionally connected with said additional member, a motor to drive said rotatable stop member, and means actuated incident to passage of an article rolled by the mill to control the rotation of said stop member.

19. In an automatic screw down for rolling mills, a mill screw driving motor, a plurality of rotatable control members rotated in synchronism with the mill screw and an additional member movable to successively coact with said members, coacting stop members, one rotating with said additional member to stop the said additional member at successive required intervals of rotation, the stop member rotating with said additional member being frictionally connected with said additional member, a motor to drive said rotatable stop member, means actuated incident to passage of an article rolled by the mill to control the rotation of said stop member, and means actuated by said stop member to reverse the driving motor thereof after a required number of partial rotations of the stop member and control members.

20. In an automatic screw down for rolling mills comprising a plurality of control members for the screw down motor operated in synchronism with the screw and an additional member movable to successively coact with said members, stop means for said additional member, releasable detent means for said stop means, said plurality of control members and said additional member having parts effective according to the relative position of said members to cause the driving of the mill screw in one or another direction, means for actuating said detent means in time with successive passages of an article through the mill, and a three position switch connected to said plurality of control members to permit said control members to automatically control the mill screw driving, when in one position, or to interrupt the automatic control in either one of its other two positions, and to connect through one or the other part of said plurality of control members at one or the other of the latter two positions for manual control of the direction of driving of said screw.

EDWIN B. HUDSON.